United States Patent

Welton

Patent Number: 6,016,320

Date of Patent: *Jan. 18, 2000

[54] TELECOMMUNICATIONS SYSTEM

[75] Inventor: Paul Douglas Welton, Harlow, United Kingdom

[73] Assignee: Northern Telecom Limited, Montreal, Canada

[*] Notice: This patent is subject to a terminal disclaimer.

[21] Appl. No.: 08/765,293

[22] PCT Filed: Jun. 21, 1995

[86] PCT No.: PCT/GB95/01453

§ 371 Date: Feb. 21, 1997

§ 102(e) Date: Feb. 21, 1997

[87] PCT Pub. No.: WO95/35614

PCT Pub. Date: Dec. 28, 1995

[30] Foreign Application Priority Data

Jun. 22, 1994 [GB] United Kingdom .................... 9412508

[51] Int. Cl.[7] ..................................................... H04B 7/212
[52] U.S. Cl. ............................................. 370/442; 370/431
[58] Field of Search ..................................... 370/442, 507, 370/347, 252, 321, 336, 337; 375/206, 258

[56] References Cited

U.S. PATENT DOCUMENTS

| 5,444,710 | 8/1995 | Fisher et al. | 370/442 |
| 5,528,596 | 6/1996 | Fisher et al. | 370/347 |
| 5,805,644 | 9/1998 | Tagawa | 375/354 |
| 5,889,765 | 3/1999 | Gibbs | 370/294 |

*Primary Examiner*—Huy D. Vu
*Assistant Examiner*—Alexander Boakye
*Attorney, Agent, or Firm*—Lee, Mann, Smith, McWilliams, Sweeney & Ohlson

[57] ABSTRACT

In a TDM communications system comprising a base station and a number of outstations, a marshalling signal enables a newly connected outstation to determine the timing of its transmission bursts A detector circuit for recovering the marshalling signal incorporates comparators whose thresholds are adjusted to the high and low levels of the normal data signal. The marshalling signal is recovered from one or other of the comparators according to whether a high or low normal data signal is received, this condition being determined by a third comparator whose threshold is adjusted midway between the high and low level. This allows the marshalling signal to be recovered continuously without interrupting normal data transmission from the outstation.

6 Claims, 3 Drawing Sheets

TELECOMMUNICATIONS SYSTEM

This invention relates to telecommunications systems and in particular to systems employing the time division multiplex/time division multiple access (TDM/TDMA) principle.

BACKGROUND OF THE INVENTION

The TDM/TDMA principle is well known in radio systems or passive optical networks (PONs), where it is employed to permit transmission between a single base station and a plurality of outstations. In the downstream (base station to outstation) direction, the information (traffic) is broadcast to all outstations, but upstream it is transmitted in bursts, each of which must be timed to avoid mutual interference (overlap) so that at any time the base station only receives data from one outstation. When a new outstation is to be connected its time of transmission must be such that it does not interfere with existing traffic transmissions and the processing required to ensure this is referred to as marshalling.

A known method of marshalling involves reservation of a period of no transmission in the upstream frame (a window). It will be appreciated that the base station broadcasts information to all outstations employing a frame, which is typically of length 125 microseconds. The outstations are all able to receive the downstream traffic at a different time, depending on their distance from the base station and the propagation delay.

Typically, in the steady state, several outstations may be already configured to send their data burst to the base station at a time which will ensure their arrival in separate bursts. A new outstation will, according to the known marshalling method, make a trial transmission into the window. The position of this is subsequently detected at the base station and used to determine the marshalling delay. In this known approach, the window in the upstream traffic flow must be at least as large as the uncertainty in the downstream and upstream loop delay. For example, with a PON, the loop delay may be 200 microseconds for a 20 Km range (i.e. the outstations may be up to 20 Km from the base station), requiring a 200 microsecond window, which would result in an equivalent additional delay in the upstream traffic, the need for all operating outstations to queue for one window's duration traffic and necessitates subsequent storage facilities, and a loss of bandwidth given by the product of the frequency of the window and its size in bits.

Our published United Kingdom specification No.2272610 describes a method of marshalling an outstation of a TDMA telecommunications system, the system including a base station and a plurality of outstations. The method includes transmitting from the outstation a sequence at a level below the noise sensitivity of a receiver at the base station, detecting the sequence at the base station, discriminating the phase of the detected sequence, and using the discriminated phase to determine the loop delay to the outstation. The sequence and its phase are determined by a correlation process.

It is an object of the present invention to provide an improved marshalling process.

SUMMARY OF THE INVENTION

According to one aspect of the present invention there is provided an arrangement for marshalling an outstation in a time division multiple access (TDMA) telecommunications system including a base station and a plurality of outstations, each said outstation having means for transmitting a marshalling sequence continuously and in parallel with a transmitted data signal, said data signal having first and second level conditions, wherein the base station incorporates first means for detecting the marshalling signal when the corresponding data signal is in its first level condition, second means for detecting the marshalling signal when the data signal is in its second level condition, charaterised in that the base station incorporates means (29) responsive to the level condition of the data signal for selectively enabling the first or second detector means.

According to a further aspect of the invention there is provided a method of marshalling an outstation in a time division multiple access (TDMA) telecommunications system including a base station and a plurality of outstations, the method comprising transmitting from each said outstation a marshalling sequence continuously and in parallel with a transmitted data signal, said data signal having first and second level conditions, characterised in that the level condition of the data signal is determined at the base station, that the marshalling signal is detected at the base station via first detecting means when the corresponding data signal is determined to be in its first level condition, and that the marshalling signal is detected at the base station via second detecting means when the data signal is determined to be in its second level condition.

As the marshalling or correlation signal is received continuously, the requirement, inherent in previous systems, to cease normal transmission periodically to recover the marshalling signal is avoided. This results in an improvement in system capacity and in the quality of service.

BRIEF DESCRIPTION OF THE DRAWINGS

An embodiment of the invention will now be described with reference to the accompanying drawings in which.

DESCRIPTION OF PREFERRED EMBODIMENT

Figure 1:
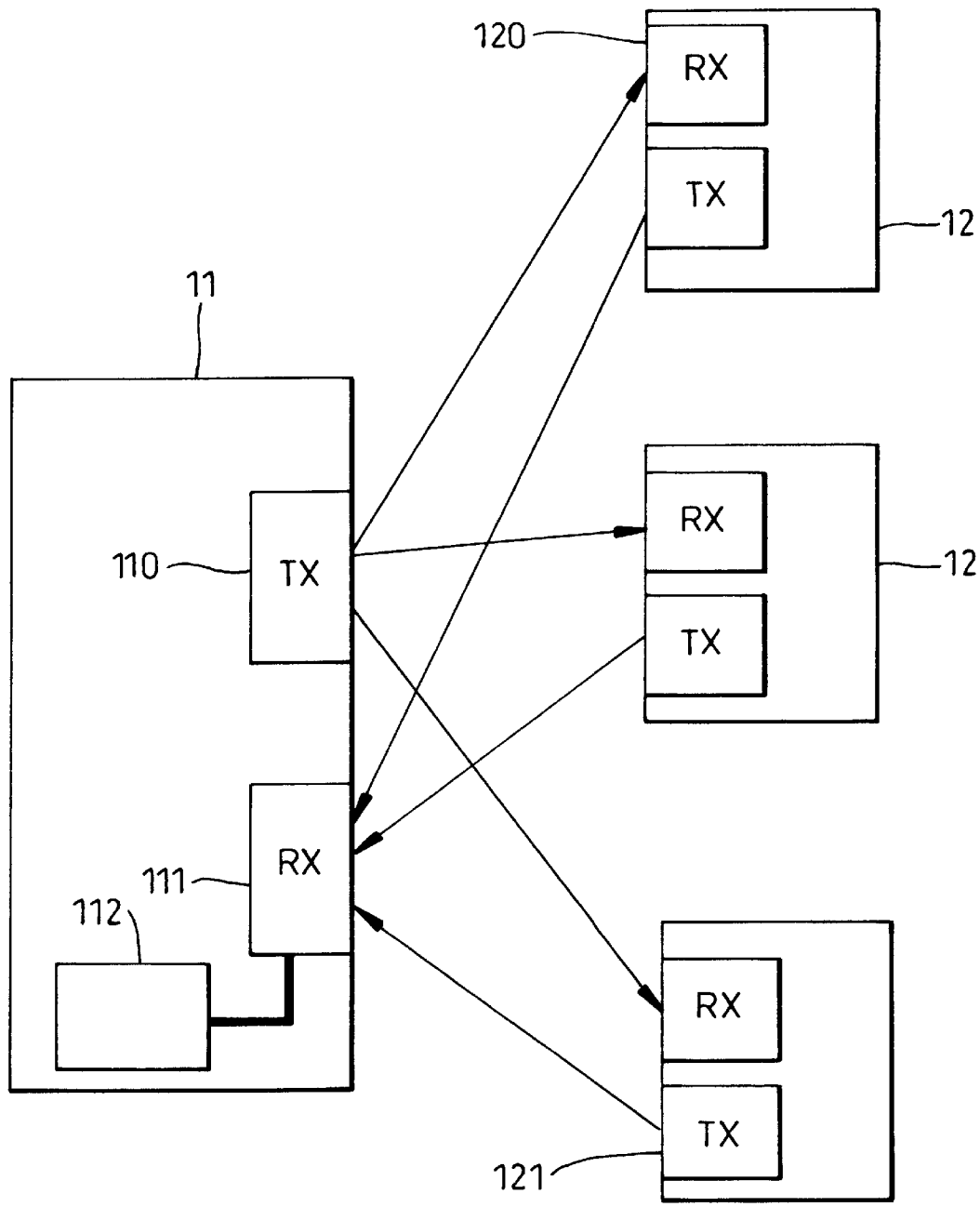
FIG. 1 is a schematic diagram of a TDMA network.

Referring first to FIG. 1, the network, which is depicted in highly schematic form, comprises a base station 11 and a number of outstations 12. The base station incorporates a transmitter 110 and a receiver 111 whereby two way communication may be established via corresponding receivers 120 and transmitters 121 provided in each outstation. Communications may be effected in a TDMA format wherein each outstation 12 wishing to transmit is allocated one or more time slots, this allocation being known as marshalling.

The system of FIG. 1 may comprise e.g. a passive optical network (PON) or a cellular radio network.

The marshalling of a new outstation is achieved by the transmission of a low level data sequence which is sent at a level which is below that which degrades the ability of the base station detector to correctly receive the traffic being received from outstations in the steady state. The signal to noise ratio required by a detector for a bit error ratio less than $10^{-9}$ is approximately 11 dB (optical), consequently, an outstation to be marshalled must transmit at a level such that the incident power of that marshalling signal at the base station receiver is at least 11 dB lower than the weakest expected steady outstation. Recovery of the marshalling signal and the data signal received from an outstation is effected via a receiver circuit 112. This circuit will be described in detail below.

Figure 2:
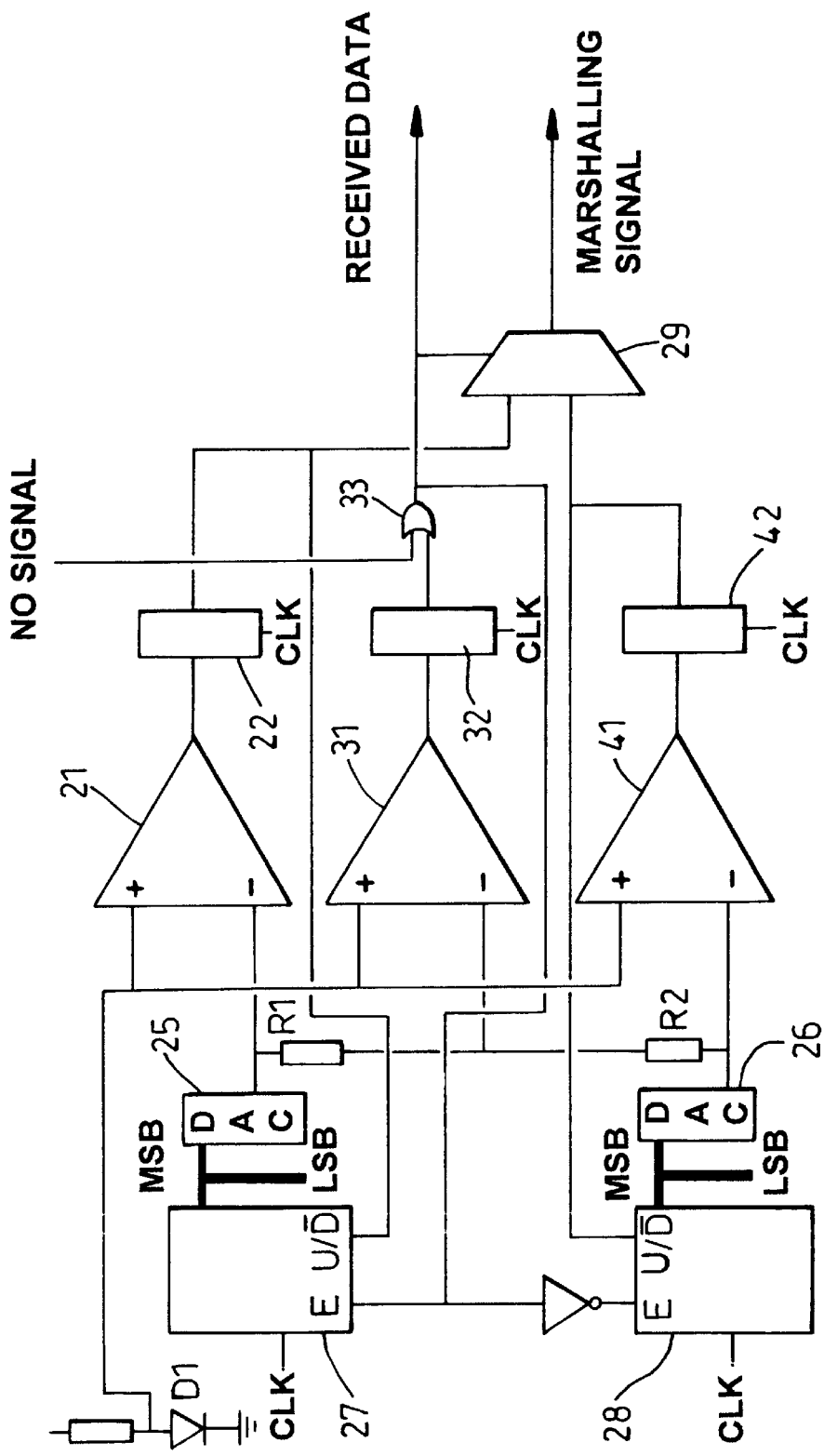
FIG. 2 is a circuit diagram of a receiver arrangement for the network of FIG. 1 for recovering both data and marshalling signals.
Figure 3:
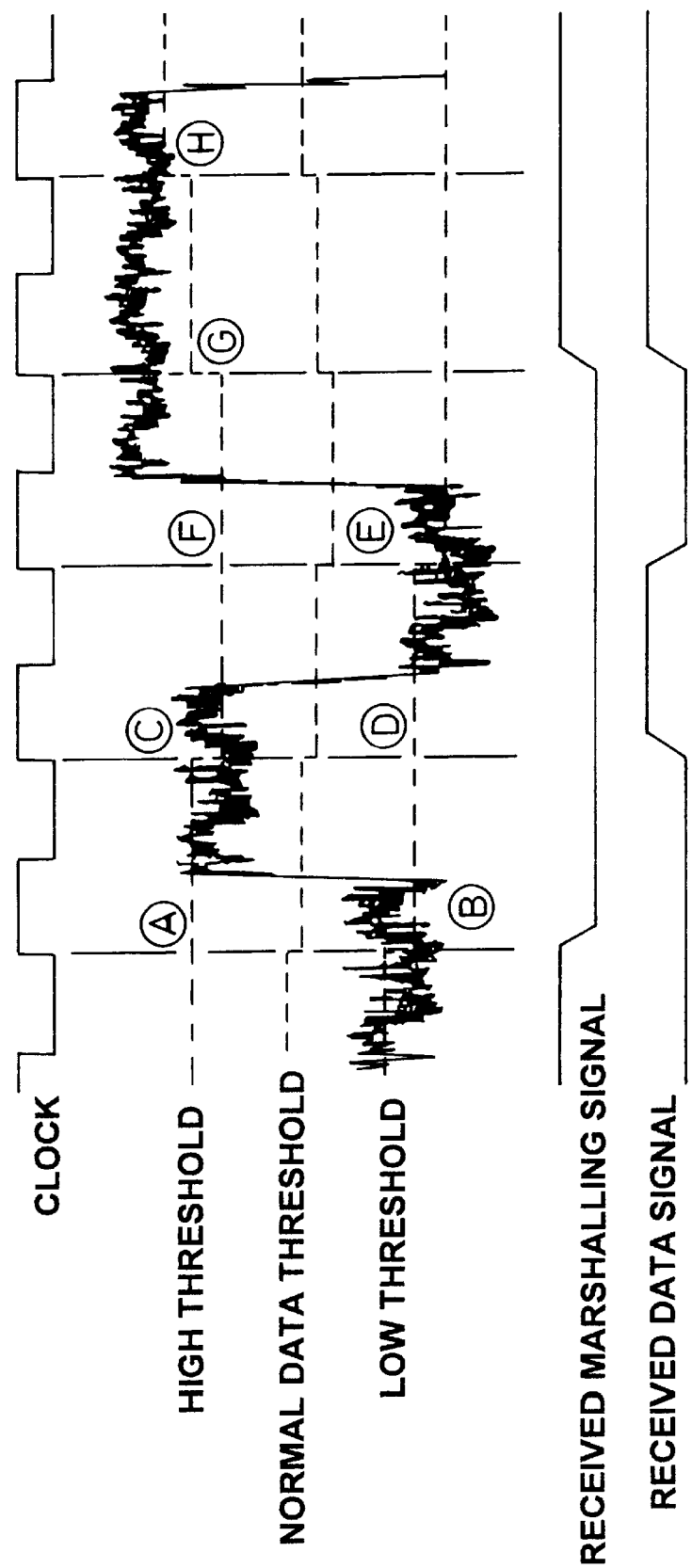
FIG. 3 illustrates the composite received signal wave forms of the circuit of FIG. 2.

Referring now to FIGS. 2 and 3, a composite wave form including data and marshalling or correlation signals is received at the circuit input (FIG. 2) which typically comprises a photo diode D1. This input signal, which is treated as an analogue signal, is compared with three different analogue reference levels respectively by three comparators 21, 31 and 41 whereby to generate corresponding digital signals. During operation of the receiver circuit, the reference or threshold levels of the comparators are continuously monitored and adjusted. These threshold levels are defined below.

High Threshold

This is the level supplied to comparator 21 and approximates to the mean level of the analogue signal when the normal data signal has the value ONE.

Low Threshold

This is the level supplied to comparator 41 and approximates to the mean level of the analogue signal when the normal data signal has the value ZERO.

Normal Data Threshold

This is the level supplied to comparator 31 and approximates to the mean of the High and Low thresholds.

The High and Low thresholds are derived from respective digital to analogue converters (DAC's) 25 and 26. The Normal Data threshold is derived as the mean of the High and Low thresholds via a potential divider comprising two substantially equal resistors R1 and R2. The DAC's 25 and 26 which generate the High and Low thresholds are driven from respective digital counter circuits 27 and 28.

The counting up and down of the two counters 27 and 28 in response to the outputs of the comparators 25 and 26 provides for automatic tracking of the optimal High and Low thresholds. The counters derive their timing from a digital clock signal CLK. On each clock edge, one or other of the counters will count in the appropriate direction to follow the received logic levels. However, it is advantageous to apply low pass filtering to the changes in the counter values in order that the thresholds change relatively slowly e.g. in response to variations in component and environmental parameters rather than in response to the marshalling signal itself. This may be achieved by deriving the thresholds from the most significant bits of the counter outputs. For example, if the marshalling sequence is repeated every 32 clock periods, then the five least significant bits of the counter outputs may be ignored.

The three comparator outputs are retimed to the digital clock CLK. The normal data traffic is obtained directly from the retimed output of comparator 21. The correlation or marshalling signal is obtained either from the retimed output of comparator 31 or of comparator 41, this selection being performed by a multiplexer 29 in response to the output of comparator 31.

The operation of the circuit will now be described with reference to FIGS. 2 and 3.

On the first active clock edge, the instantaneous value of the received signal is below the Normal Data threshold. Therefore the data is assumed to have a value ZERO and the counter 27 controlling the High threshold is not enabled and retains its current value (A—FIG. 3), while the counter 28 controlling the Low threshold counts down because the received signal is below the Low threshold (B). The correlation or marshalling signal is assumed to have the value ZERO. On the second clock edge, the received signal has a value greater than the Normal Data threshold so tale data signal is received as a ONE. The High threshold is adjusted downwards (C) because the received signal level is below that threshold, while the Low threshold remains unchanged (D). At points (E) and (F) respectively of FIG. 3, the Low threshold is adjusted downwards while the High threshold remains unchanged. At points (G) and (H) the High threshold is adjusted upwards twice in succession in response to an increase in the normal data signal level. Such dynamic changes in amplitude are typical in a practical communications system.

The technique is applicable both to point-to-multipoint and to point-to-point networks. The normal data transmitted from a plurality of outstations or remote nodes is received at the hub or base station node of such a network e.g. using a TDMA technique in which transmissions are received from each outstation in turn. To apply the technique to such a network, the values in the counters 27 and 28 are selected individually to match the transmission level of each outstation. This may be achieved by storing appropriate values for each outstation and, at any particular time, retrieving the values for the particular outstation whose transmissions are expected. In such an arrangement a guard band may be provided between successive transmissions from outstations to allow time for retrieval of the corresponding stored data. During such a guard band, or during any period within which no data transmission is being received, the receiver circuit must be controlled to ensure that the marshalling signal is received correctly. For this purpose the "no signal" input to gate 33 of the circuit of FIG. 2 is held at the logic ONE level and the High threshold alone is used for signal detection.

In the circuit arrangement described above, the Normal Data threshold is set to the mid-point of the received value of the high and low logic levels of the normal data signal irrespective of the proportion of ONE's and ZERO's in that signal. For example, if the normal data contains ten logic ONE's to each logic ZERO, then the High threshold will be adjusted ten times more often than the Low threshold. However, the adjustments themselves are not prejudiced by the frequency of their occurrence and the mean level comprising the Normal Data threshold is thus unaffected. Setting this threshold to the mid-point level is advantageous as this minimises the bit error rate (BER). The technique thus overcomes the requirement of conventional systems to balance the numbers of ONE's and ZERO's.

I claim:

1. An arrangement for marshalling an outstation in a time division multiple access (TDMA) telecommunications system including a base station and a plurality of outstations, each said outstation having means for transmitting a marshalling sequence continuously and in parallel with a transmitted data signal, said data signal having a first high logic level condition and a second low logic level condition, wherein the base station incorporates first detection means for detecting the marshalling signal when the corresponding data signal is in its first level condition, second detection means for detecting the marshalling signal when the data signal is in its second level condition, wherein the base station incorporates means responsive to the level condition of the data signal for selectively enabling the first or second detector means, wherein said first and second detection means comprise respective first and second comparators each of whose threshold is adjusted to the respective high or lower level condition of the data signal so as to effect detection of the marshalling signal during that data signal level condition, and wherein the high or low level condition of the data signal is determined via a third comparator whose threshold is adjusted to a level between said first and second levels.

2. An arrangement as claimed in claim 1, wherein the respective thresholds of the first and second comparators are derived each from a corresponding counter arranged to count clock pulses in an increasing or decreasing direction corresponding to the current respective first or second level condition of the data signal.

3. A method of marshalling an outstation in a time division multiple access (TDMA) telecommunications system including a base station and a plurality of outstations, the method comprising transmitting from each said outstation a marshalling sequence continuously and in parallel with a transmitted data signal, said data signal having a first high level condition and a second low level condition, determining at the base station the current high or low level condition of the data signal received from the outstation, detecting said marshalling signal at the base station via a first detection means when said data signal is in its first condition and via a second detection means when said data signal is in its second condition, and correlating said detected marshalling signal so as to determine a timing reference for the outstation.

4. A method of marshalling an outstation in a time division multiple access (TDMA) telecommunications system including a base station and a plurality of outstations, the method comprising transmitting from each said outstation a marshalling sequence comprising a pseudo-random binary sequence continuously and in parallel with a transmitted data signal, said data signal having a first high level condition and a second low level condition, determining at the base station the current high or low level condition of the data signal received from the outstation, detecting said marshalling signal at the base station via a first detection means comprising a first comparator whose threshold level corresponds to the first level condition of the data signal when said data signal is in that first condition, and via a second detection means comprising a second comparator whose threshold level corresponds to the second level condition of the data signal when said data signal is in that second condition, and correlating said detected marshalling signal so as to determine a timing reference for the outstation.

5. A method as claimed in claim 4, wherein the first or second level condition of the data signal is determined via a third comparator whose threshold is adjusted to a level between said first and second levels.

6. A method as claimed in claim 5, wherein the respective thresholds of the first and second comparators are derived each from a corresponding counter arranged to count dock pulses in an increasing or decreasing direction corresponding to the current respective first or second level condition of the data signal.

\* \* \* \* \*